United States Patent [19]

Self

[11] 4,274,204
[45] Jun. 23, 1981

[54] AIRCRAFT TRAFFIC PATTERN COMPUTER

[76] Inventor: Freddy R. Self, 933 Parkside Dr., Richmond, Calif. 94083

[21] Appl. No.: 82,951

[22] Filed: Oct. 9, 1979

[51] Int. Cl.³ .............................................. G01C 21/20
[52] U.S. Cl. .................................. 33/1 SD; 235/61 B
[58] Field of Search ..................... 33/1 SD, 1 SB, 1 R, 33/1 B, 1 N, 403, 431; 235/61 B, 61 NV

[56] References Cited

U.S. PATENT DOCUMENTS

| 3,100,601 | 8/1963 | Shapiro | 235/61 B |
| 3,110,965 | 11/1963 | Kittock | 33/1 SD |

Primary Examiner—William D. Martin, Jr.
Attorney, Agent, or Firm—Bielen and Peterson

[57] ABSTRACT

An aircraft traffic pattern computer employing a slotted frame having a window surrounded by a compass rose which is movable in relation to the frame about a pivot point, the slotted frame being adapted for holding a placard having a pair of surfaces upon which various aircraft movement patterns are shown about a reference point and a reference line such that alignment of the reference point with the center of the compass rose and alignment of the reference line with the compass rose proper provides at least one selected course heading for an aircraft.

4 Claims, 3 Drawing Figures

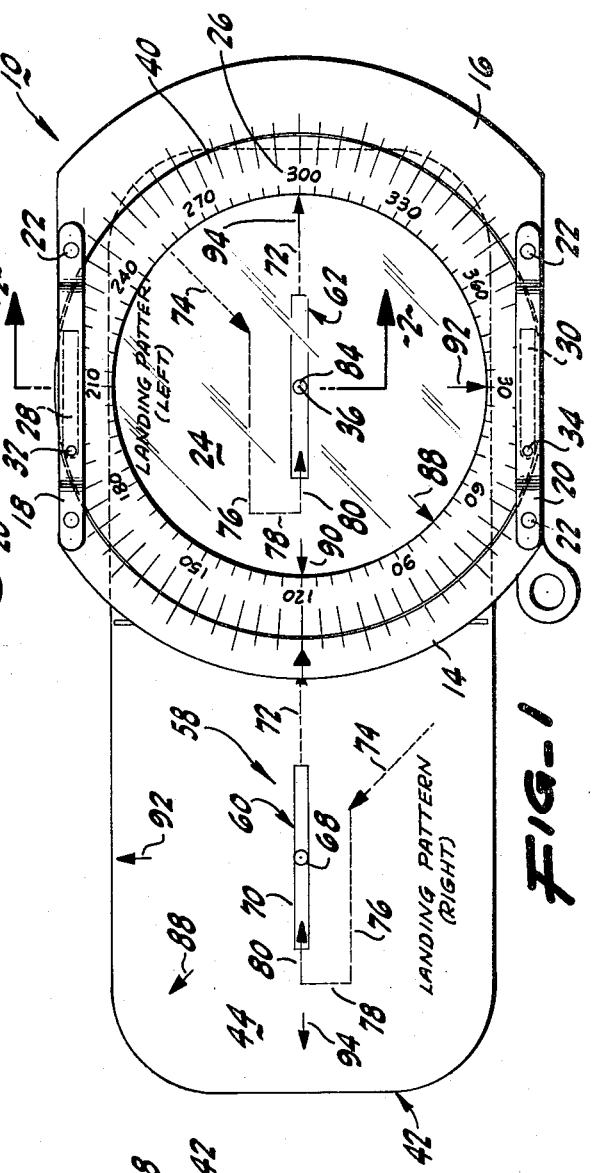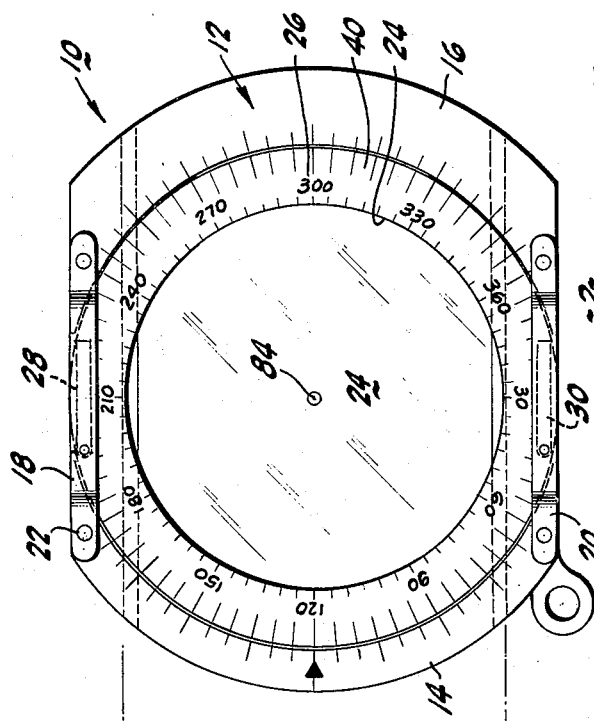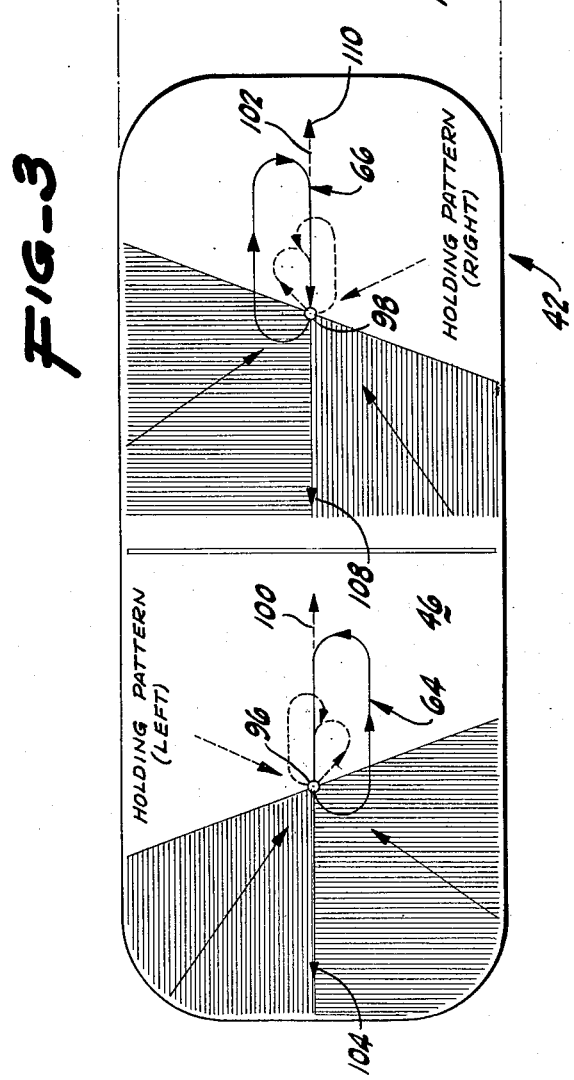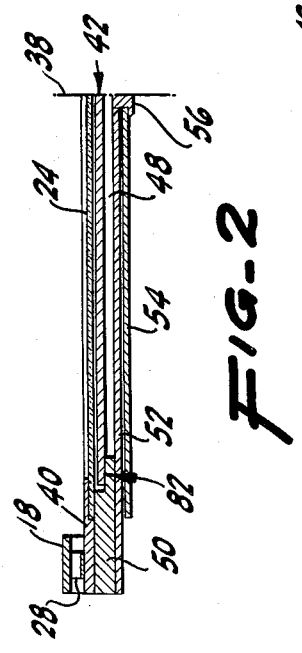

AIRCRAFT TRAFFIC PATTERN COMPUTER

BACKGROUND OF THE INVENTION

The present invention relates to a novel aircraft traffic pattern computer for aiding a pilot during aircraft maneuvers requiring specific course headings.

Piloting an aircraft demands exacting coordination between hand and foot, and the senses, particularly the sense of sight. During steady flight operations the pilot may easily read a map or use other means of obtaining the position, course, and heading of the aircraft. However, during the most exacting maneuvers such as take-off, landing, confinement within a holding pattern and the like, the pilot is hard pressed to quickly calculate the values for course headings with great exactitude.

There have been devices in the form of computers which are able to calculate to air speed, duration of flight, and the effective wind on air speed and course of the aircraft. Certain devices have been provided which visually indicate holding patterns in relation to a pivot point. In this regard, the "Holding Pattern Computer" manufactured by Jeppesen and Co., Denver, Colo. is an example of such a device.

There is a need for a air traffic pattern computer which may be quickly set and easily interpreted for the purposes of providing information concerning flight patterns of an aircraft.

SUMMARY OF THE INVENTION

In accordance with the present invention a novel and useful aircraft traffic pattern computer and method of computing aircraft traffic patterns is provided.

The aircraft traffic pattern computer of the present invention includes a slotted frame having a window on at least one side of the same. Also, a compass rose lies adjacent the slotted frame and is movable in relation thereto about a pivot point.

A placard also is provided in the present invention having a first and an opposite second surface. The placard is adapted to fit within the slot of the frame such that one may view either the first or second surface of the placard through the window. The placard is movable in relation to the slotted frame such that different portions of one surface may be viewed simultaneously. One embodiment of the present invention permits the sliding of the placard n relation to slotted frame. An aircraft movement pattern is placed on either the first or second surface of the placard in relation to a reference point and a reference line. In the case of an aircraft runway, the reference line would represent a line running through the center and along the length of the runway. A reference point would represent the very center of the runway.

Means for aligning the aircraft movement pattern reference point with the center of the compass rose is also included in the present invention. As herebefore stated, the placard may be adapted for sliding within the slotted frame. In addition, such sliding motion may be employed to accurately align the pivot point of the compass rose with the reference point on a particular flight pattern rendition found on the placard. Moreover, a plurality of aircraft movement patterns may be placed on a single side of the placard or on opposite sides of the placard. In the case of a landing pattern this aspect may be particularly useful where a pilot has the option of landing an aircraft using either a right or left hand pattern.

Finally, the computer of the present application also embraces means for indicating at least one selected course heading for an aircraft upon alignment of the aircraft movement reference point and the center of the compass rose. Proper course headings will be immediately indicated with alignment of the reference line and the compass rose proper. Such means for indicating course headings may take the form of further markings on the periphery of the placard adjacent the compass rose. On the other hand, such means may be apparent to more skilled pilots simply by setting the compass rose in relation to the reference line found on the aircraft movement pattern which is visible on the placard.

The present invention may be also deemed to include a method of providing a slotted frame including a window on at least one side thereof as well as a compass rose adjacent the window. Again, such a compass rose would be movable about a pivot. Further steps would include providing a placard having a first surface and an opposite second surface and including at least one rendition of aircraft movement pattern on the first surface of the placard about a reference point and a reference line; sliding the placard within the slotted frame; aligning the aircraft movement pattern referend point with the pivot of the compass rose and aligning the aircraft movement pattern reference line with the compass rose indicating the direction of the reference line. The method may also be deemed to include selecting one of a multiplicity of aircraft movement patterns on the same side of the placard or on opposite sides thereof.

It may be apparent that a novel and useful aircraft traffic pattern computer has been described heretofore.

It is therefore an object of the present invention to provide an aircraft traffic pattern computer which is useable at about the time precision maneuvers are required of an aircraft while in flight.

It is another object of the present invention to provide an aircraft traffic pattern computer which rapidly displays a multiplicity of course headings required to effect precise aircraft movements.

It is another objection of the present invention to provide an aircraft traffic computer which is portable and operates mechanically.

It is yet another objection of the present invention to provide an aircraft traffic pattern computer which displays a multiplicity of types of aircraft movement patterns and thus aids the pilot in safely operating an aircraft.

It is still another object of the present invention to provide an aircraft traffic pattern computer which serves as a teaching air for novice pilots.

The invention possesses other objects and advantages especially as concerns particular features and characteristics thereof which will become apparent as the specification continues.

BRIEF DESCRIPTION OF THE DRAWINGS

FIG. 1 is a top plan view of the device of the present invention.

FIG. 2 is a view taken along line 2—2 of FIG. 1.

FIG. 3 is a top plan exploded view of the device of the present invention.

For a better understanding of the invention, reference is made to the following detailed description.

DESCRIPTION OF THE PREFERRED EMBODIMENTS

Various aspects of the present invention will evolve from the following detailed description of the preferred embodiments thereof, which should be taken in conjunction with the heretofore described drawings.

With reference to the drawings the invention as a whole is depicted by reference character 10 and includes as one of its elements a slotted frame 12. FIG. 1 depicts frame 12 as having a first portion 14 and a second portion 16 of rounded configuration. A pair of bars 18 and 20 span frame members 14 and 16, connection being effected by fastening means 22 which may be screws, rivets, glue, and the like. The frame member may be constructed of any rigid or semirigid material such as metal, plastic, wood, or similar materials. Slotted frame 12 includes a window 24 formed of transparent material. Surrounding window 24 is a compass rose 26 which, in the embodiment shown in FIGS. 1, 2, and 3, is fastened to window 24 for movement therewith. Spring means 28 and 30 retain compass rose within slotted frame 12. Spring means 28 and 30 are held in place by rivets 32 and 34. Compass rose 26 and attached window 24 move about point 36, FIG. 1, which is the meeting point of axis 38 and window 24, FIG. 1. Wing 40 serves as a hanger for device 10 during storage.

A placard 42 having a first surface 44 and an opposite second surface 46, fits within slot 48 of placard 42. It should be apparent that either first surface 44 or second surface 46 may be placed within slot 48 such that indicia upon either surface may be viewable through window 24. Placard 42 slides on member 50 which serves to guide the placard 42 through slot 48. The plate 52 is fastened to member 50 and supports plate 54 via rivet 56. Plate 54 and plate 56 may be employed as a circular slide rule which is known in the art and is outside the realm of the present application.

Placard 42 includes means 58 for representing at least one aircraft movement pattern about a reference point and a reference line. As shown in the embodiments, hereindisclosed, placard 42 includes patterns 60 and 62 on first surface 44 thereof. Patterns 64 and 66 appear on second surface 46 of placard 42 and will be described hereinafter. Patterns 60 and 62 represent right and left landing patterns for an aircraft. Reference point 68 is the very center of runway 70 depicted on landing pattern 60 and 62. Reference line 72 runs along the length of runway 70 and is parallel to both sides thereof. Focussing on pattern 62 it may be seen that it includes an airport approach course line 74, a down wind course line 76, a cross wind course line 78, and final course line 80. It should be noted that course line 70, 76, 78, and 80 represent the acutal legs of a left landing pattern which are flown by an aircraft landing on runway 70.

The device of the present application includes means 82 for aligning reference point 68 with center 84 of compass rose 26. Means 82 takes the form of sliding placard 42 in relation to member 50. Another member identical to member 50 is formed on the opposite side of frame 12 (not shown), to form a track within slot 48. Also, reference line 72 moves directly beneath the center 84 of compass rose 26 as placard 42 slides within slot 48.

A further element of the present invention is means 65 for indicating at least one selected course heading for an aircraft upon alignment of reference point 68 and reference line 72 with the center 84 of compass rose 26 and the compass rose 26 proper respectively. FIG. 1 indicates an arrow 88 which points to a course in terms of a compass value for approach course line 74. Likewise, arrows 90, 92, and 94 show other values of compass courses corresponding to courses 76, 78, and 80 respectively.

Returning to FIG. 3, pattern 64 and 66 include reference points 96 and 98 as well as reference lines 100 and 102 respectively. Means 86 takes the form of arrows 104, 106, 108, and 110.

In operation, the user desirous of landing an aircraft would slide placard 42 within slot 48 of frame 12 such that first surface 44 and the patterns 60 and 62 are capable of being viewed through window 24. For example, an aircraft cleared for landing on "runway 30" by means of a left hand landing pattern, would align reference point 68 of pattern 62 with center 84 of compass rose 26. Line 72 and arrow 94 would then be aligned with azimuth reading 300° on compass rose 26 by turning compass rose 26 to the configuration shown on FIG. 1. At this point the proper course headings for landing an aircraft are visible to the pilot of the aircraft. For example, approach course 74 is indicated by arrow 88 as 75 degrees, down wind leg is indicated by arrow 90 as being 120 degrees, arrow 92 depicts cross wind leg 78 as being 30 degrees, and the final leg is shown by arrow 94 as being 300 degrees. If the aircraft receives special permission to perform a right landing pattern, the pilot merely slides pattern 60 through slot 48 of frame 12 and repeats the process heretofore described for landing pattern 62. On the other hand if the aircraft must perform a holding pattern, placard 42 is flipped to the opposite second surface 46 and the proper reference points 96 or 98 and reference lines 100 or 102 are aligned with the compass rose 26 such that the pilot may perform the holding patterns shown. Other patterns may be depicted on placard 42 or on a plurality of placards as necessary. It should be noted that the present application also includes a method for computing aircraft traffic patterns as hereinbefore described.

The device or method of the present application may be employed for land or water based vehicles, but is particularly useful for aircraft because the proper pattern is arrived at with extreme rapidity which compliments the split second decisions necessary to manuever an aircraft which moves at very high speeds.

While in the foregoing specification embodiments of the present invention have been set forth in considerable detail for the purposes of making a complete disclosure thereof, it should be obvious to those of ordinary skill in the art that numerous changes may be made in such details without departing from the spirit and principles of the invention.

What is claimed is:

1. In an aircraft traffic pattern computer including a slotted frame including a window on at least one side thereof, and a compass rose having azimuth indicia adjacent said window, said compass rose being movable about a pivot, the improvement comprising:
   a. a placard having at least a first surface, said placard slidably fitting within the slot of the frame such that said at least a first surface of said placard is viewable through the window of the slotted frame, said placard including means for representing at least a first and a second aircraft movement pattern each oriented in relation to reference point and at least one reference line upon said at least a first surface;

b. means for selectively aligning said first and second aircraft movement pattern reference points with the center of the compass rose, including providing the compass rose with a marking indicating the center point thereof; and c. means for indicating at least one selected course heading for an aircraft upon selective alignment of said first and second aircraft movement pattern reference points with said marking indicating the center of the compass rose and alignment of said selected first and second aircraft movement pattern reference lines with the compass rose including at least one marking on said at least first surface of said placard indicating a particular course heading capable of being placed immediately adjacent the azimuth indicia of the compass rose.

2. The aircraft traffic computer of claim 1 which further comprises said placard including a second surface in opposite relationship to said first surface, said second surface including at least a third aircraft movement pattern oriented in relation to a reference point and a reference line upon said second surface;

means for aligning said third aircraft movement pattern reference point with said marking indicating the center of the compass rose; and means for indicating at least one selected course heading for an aircraft upon alignment of said third aircraft movement pattern reference point with said marking indicating the center of the compass rose and alignment of said third aircraft movement pattern reference line with the compass rose including at least one marking on said second surface indicating a particular course heading.

3. The aircraft traffic computer of claim 1 which further comprises said placard, said second surface including a fourth aircraft movement pattern oriented in relation to a reference point and a reference line upon said second surface, means for selectively aligning said third and fourth aircraft movement pattern reference points with said marking indicating the center of the compass rose; and means for indicating at least one selected course heading for an aircraft upon selective alignment of said third and fourth aircraft movement pattern reference points with said marking indicating the center of the compass rose, and alignment of said selected third and fourth aircraft movement pattern reference lines with the compass rose including at least one marking indicating a particular course heading.

4. A method of computing aircraft traffic patterns comprising the steps of:

a. providing a slotted frame including a window on at least one side thereof;

b. providing a compass rose having azimuth indicia adjacent said window and a marking on said window indicating the center of the compass rose, said compass rose being moveable about a pivot;

d. providing a placard having at least a first surface and a first and second aircraft movement pattern, each oriented in relation to a reference point and at least one reference line, upon said at least first surface;

d. sliding said placard within said slotted frame;

e. selectively aligning said first and second aircraft movement pattern reference points with said marking indicating the center of said compass rose;

f. simultaneously aligning said aircraft movement pattern reference line of said selected first and second aircraft movement pattern with said compass rose indicating the direction of said reference line and aligning at least one marking on said at least first surface immediately adjacent the azimuth indicia of the compass rose.

* * * * *